(12) United States Patent
Carrender

(10) Patent No.: US 6,975,229 B2
(45) Date of Patent: Dec. 13, 2005

(54) SYSTEM AND METHOD FOR ACQUISITION MANAGEMENT OF SUBJECT POSITION INFORMATION

(75) Inventor: Curt Carrender, Morgan Hill, CA (US)

(73) Assignee: Battelle Memorial Institute K1-53, Richland, WA (US)

( * ) Notice: Subject to any disclaimer, the term of this patent is extended or adjusted under 35 U.S.C. 154(b) by 310 days.

(21) Appl. No.: 10/215,710

(22) Filed: Aug. 9, 2002

(65) Prior Publication Data

US 2004/0027243 A1 Feb. 12, 2004

(51) Int. Cl.$^7$ .............................................. G08B 13/14
(52) U.S. Cl. .............................. 340/572.4; 340/572.1; 340/539.13; 340/539.19
(58) Field of Search .................... 340/539.1, 539.13, 340/539.15, 539.19, 572.1, 573.1, 573.4, 825.36, 825.49, 5.3, 10.41, 572.4, 539.11, 10.1, 10.5; 342/357.1, 357.07, 357.09, 457

(56) References Cited

U.S. PATENT DOCUMENTS

| | | | | |
|---|---|---|---|---|
| 3,785,510 A | * | 1/1974 | Grooteboer | 198/349.9 |
| 5,014,206 A | | 5/1991 | Scribner et al. | 701/207 |
| 5,751,246 A | * | 5/1998 | Hertel | 342/357.07 |
| 5,825,283 A | * | 10/1998 | Camhi | 340/438 |
| 5,892,441 A | * | 4/1999 | Woolley et al. | 340/539.26 |
| 5,936,572 A | * | 8/1999 | Loomis et al. | 342/457 |
| 6,100,806 A | * | 8/2000 | Gaukel | 340/573.4 |
| 6,405,213 B1 | * | 6/2002 | Layson et al. | 340/573.1 |
| 6,614,394 B2 | * | 9/2003 | Honda et al. | 342/357.1 |

FOREIGN PATENT DOCUMENTS

| | | |
|---|---|---|
| EP | 1 211 658 A2 | 6/2002 |
| GB | 2 298 099 A | 8/1996 |

* cited by examiner

Primary Examiner—Van T. Trieu
(74) Attorney, Agent, or Firm—Seed IP Law Group PLLC

(57) ABSTRACT

A system and method for acquisition management of subject position information that utilizes radio frequency identification (RF ID) to store position information in position tags. Tag programmers receive position information from external positioning systems, such as the Global Positioning System (GPS), from manual inputs, such as keypads, or other tag programmers. The tag programmers program each position tag with the received position information. Both the tag programmers and the position tags can be portable or fixed. Implementations include portable tag programmers and fixed position tags for subject position guidance, and portable tag programmers for collection sample labeling. Other implementations include fixed tag programmers and portable position tags for subject route recordation. Position tags can contain other associated information such as destination address of an affixed subject for subject routing.

37 Claims, 8 Drawing Sheets

SYSTEM AND METHOD FOR ACQUISITION MANAGEMENT OF SUBJECT POSITION INFORMATION

STATEMENT OF GOVERNMENT INTEREST

This invention was made with government support under Contract DE-AC0676RLO1830 awarded by the U.S. Department of Energy. The government has certain rights in this invention.

BACKGROUND OF THE INVENTION

1. Field of the Invention

The invention relates generally to systems and methods associated with subject position information and more particularly to acquisition management of subject position information.

2. Description of the Related Art

Systems and methods for acquisition management of subject position information conventionally have wide application in daily commerce. These conventional systems include recordation of prior positions occupied, identification of present position, and guidance regarding future positions of a subject. Implementation details vary according to the particular conventional system.

Technology of the conventional systems can include optical, magnetic, or visual scanning of a subject, a subject's printed address, or a track of a subject's intended path. These approaches generally require close proximity, predetermined orientation, and high visibility of the subject to the system, inflexible plans for subject position guidance, manual intervention with recordation, identification, and guidance, and other performance reducing requirements. Conventional integration of the recordation, identification, and guidance functions can also include requirements, that may increase weight, size, and cost of the systems involved.

Other conventional systems use external reference systems, such as the Global Positioning System (GPS) managed by the United States Department of Defense, to provide position reference data. Unfortunately, these external reference systems are not always as useful as hoped due, in part, to problems related to signal interference, such as found inside buildings and geological structures, and less than sufficient resolution of subject position provided by the external reference system.

BRIEF SUMMARY OF THE INVENTION

The disclosed embodiments of the invention are directed to acquisition management of subject position information. In one embodiment, a position tag is provided having a memory configured to store position information, at least one radio frequency antenna, and a receiver circuit coupled to the at least one radio frequency antenna. The receiver is configured to receive control signals and position request signals via the at least one radio frequency antenna, and to send signals containing position information via the at least one radio frequency antenna responsive to the position request signals. The memory is configured to store position information in response to the control signals and to recall position information in response to the position request signals.

In accordance with another embodiment of the invention, a position tag programmer is provided having at least one radio frequency antenna, a receiver configured to receive position information radio signals from an external position reference system via the at least one radio frequency antenna, and a tag program transmitter coupled to the receiver. The tag programmer transmitter is configured to transmit position information control signals via the at least one radio frequency antenna to a position tag for storage in the position tag of the position information received from the external position reference system.

In accordance with yet another embodiment of the invention, a position tag reader is provided having at least one radio frequency antenna, a transmitter coupled to the at least one radio frequency antenna and configured to transmit a position information request signal to a position tag via the at least one radio frequency antenna, and a receiver coupled to the at least one radio frequency antenna. The receiver is configured to receive a signal containing position information from the position tag requested through the position information request signal sent by the transmitter to the position tag.

In accordance with one of the method embodiments of the present invention, a method of programming a radio frequency identification (RFID) tag is provided including receiving position information from an external positioning system, and sending control instructions and the position information via radio signals to the RFID tag to store the position information in the RFID tag.

BRIEF DESCRIPTION OF THE SEVERAL VIEWS OF THE DRAWING(S)

The features and advantages of the invention will become apparent from the following detailed description when taken in conjunction with the accompanying drawings, wherein.

DETAILED DESCRIPTION OF THE INVENTION

Implementations of a system and method for acquisition management of subject position information are described herein. The position acquisition management system uniquely applies radio frequency technology to challenges involved with recordation of prior positions occupied, identification of present position, and guidance regarding future positions of a subject. Radio frequency identification (RFID) tags, whose general use is known in the art, are uniquely used to store and retrieve position information of designated subjects at given moments of subject travel.

Some implementations will program position tags with predetermined architectural, geological, geographical, or other position information to be later used as position references to assist in guiding travel of users, robots, vehicles, or other subjects. Other implementations use position tags configured to store multiple position identifications to record information regarding routes taken by given subjects. In certain implementations, addressed position tags are attached to subjects to indicate destination information for delivery of the subjects. These addressed position tags can contain other information such as identification of the origination, sender, and receiver of the subjects. Implementations can use portable programmers to program position tags with position information including that obtained from external positioning systems such as the Global Positioning System (GPS) managed by the Department of Defense. Stationary programmers can be used to program position tags, such as with route recordation, as the position tags pass pre-designated positions.

Figure 1:
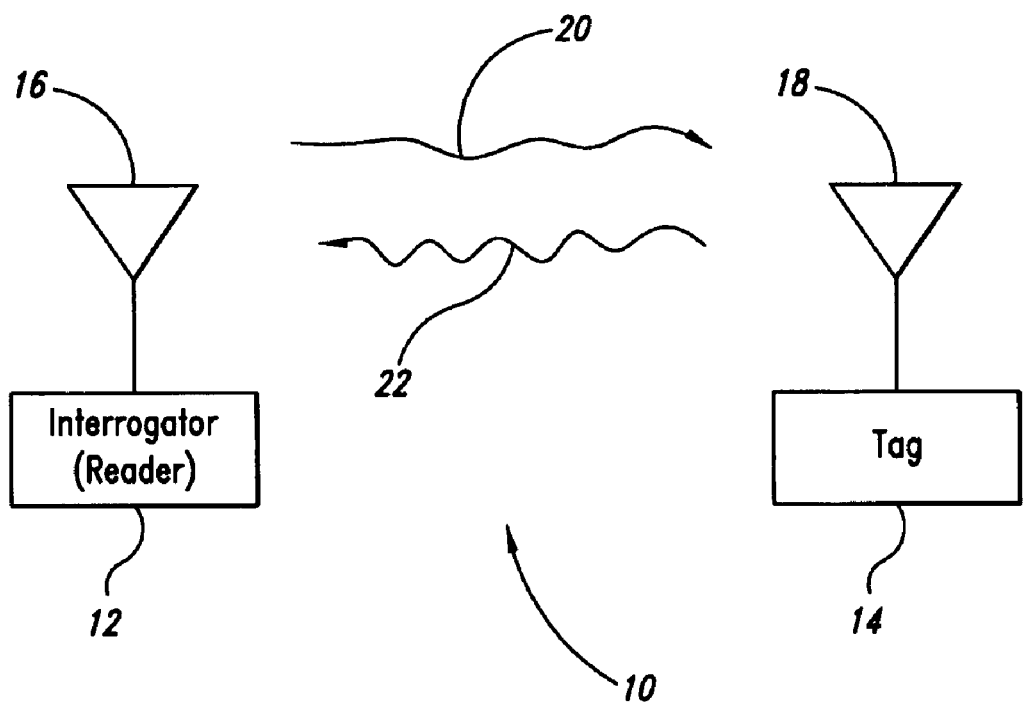
FIG. 1 is a schematic diagram of a position acquisition management system using RFID devices in accordance with an implementation of the present invention.

As shown in FIG. 1, a basic RFID system 10 includes two components: an interrogator or reader 12, and a transponder (commonly called an RF tag) 14. The interrogator 12 and RF tag 14 include respective antennas 16, 18. In operation, the interrogator 12 transmits by a transmitter component (not shown) through its antenna 16 a radio frequency interrogation signal 20 to the antenna 18 of the RF tag 14. In response to receiving the interrogation signal 20, the RF tag 14 produces a modulated response signal 22 that is transmitted back to the interrogator 12 through the tag antenna 18 by a process known as continuous wave backscatter and is received by a receiver component (not shown) of the interrogator 12.

The substantial advantage of RFID systems is the non-contact, non-line-of-sight capability of the technology. The interrogator 12 emits the interrogation signal 20 with a range from one inch to one hundred feet or more, depending upon its power output and the radio frequency used. Tags can be read through a variety of substances such as dispersions, fog, ice, paint, dirt, and other visually and environmentally challenging conditions where bar codes or other optically-read technologies would be useless. RF tags can also be read at high speeds, in most cases responding in less than one hundred milliseconds.

RF tags are divided into three main categories: Beam-powered passive tags, battery-powered semi-passive tags, and active tags. Each operates in different ways.

The beam-powered RFID tag is often referred to as a passive device because it derives the energy needed for its operation from the interrogation signal beamed at it. The tag rectifies the field and changes the reflective characteristics of the tag itself, creating a change in reflectivity that is seen at the interrogator. The battery-powered semi-passive RFID tag operates in a similar fashion, modulating its RF cross-section in order to reflect a delta to the interrogator to develop a communication link. Here, the battery is the source of the tag's operational power for optional circuitry. Finally, in the active RF tag, a transmitter is used to create its own radio frequency energy powered by the battery.

The range of communication for such tags varies according to the transmission power of the interrogator 12 and the RF tag 14. Battery-powered tags operating at 2,450 MHz have traditionally been limited to less than ten meters in range. However, devices with sufficient power can reach up to 200 meters in range, depending on the frequency and environmental characteristics.

In one embodiment of the present invention, the response signal 22 is used to send position information from a unique type of RF tag known herein as a position tag 30. The position tag 30 is configured to contain information regarding one or more positions, which can be programmed into and retrieved from the position tag through use of RF signals. The position information could be stored in a memory of the position tag 30. Alternatively, a pointer in the position tag 30 could point to a position-related reference. With some implementations, the position tag 30 contains additional information, also referred to herein as position information. Position information for the position tag 30 could also include information associated with a position, such as, time of day that a position was achieved, and characteristics of the tagged subject, such as type (vehicle, robot, individual, etc.), owner identification, origination, destination, intended recipient, associated cost, product constituents, warranty information, associated purchaser, location of sale, seller identification, recycling information, instructor identification, associated warnings, storage information, and destruction instructions.

Figure 2:
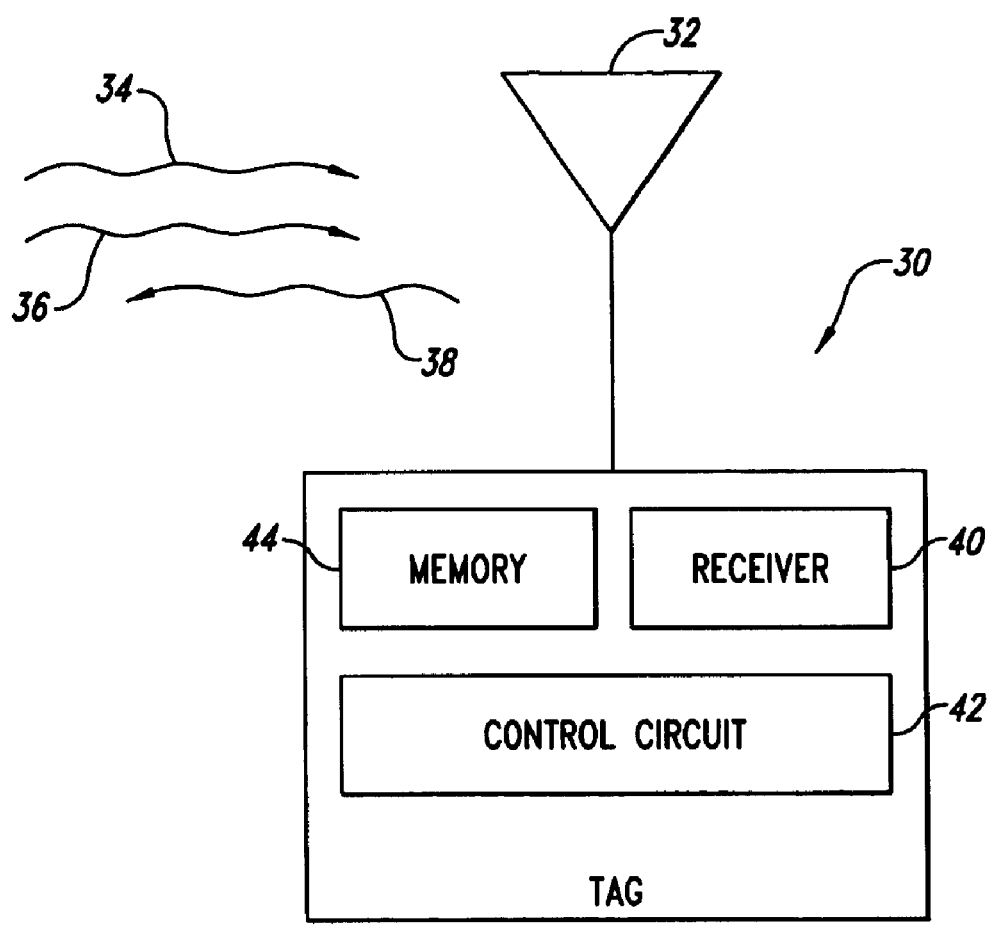
FIG. 2 is a schematic diagram showing additional detail of a position tag shown in FIG. 1.

As shown in FIG. 2, the position tag 30 includes a position tag antenna 32 to receive position information request signals 34, to receive position information programming control signals 36, and to send requested position information 38. Multiple antennas can be used in some implementations as the tag antenna 32. A receiver 40 is communicatively linked to the position tag antenna 32 and a control circuit 42 to process the position information request signals 34, to respond with the requested position information 38 retrieved from a memory 44, and to process the position information programming control signals 36 to store position information into the memory 44. The receiver 40 is configured to enable the position tag 30 to return the requested position information 38 as a radio signal shown in FIG. 2. Some implementations include the functions of the control circuit 42 either being performed by the receiver 40, the memory 44, or both.

Figure 3:
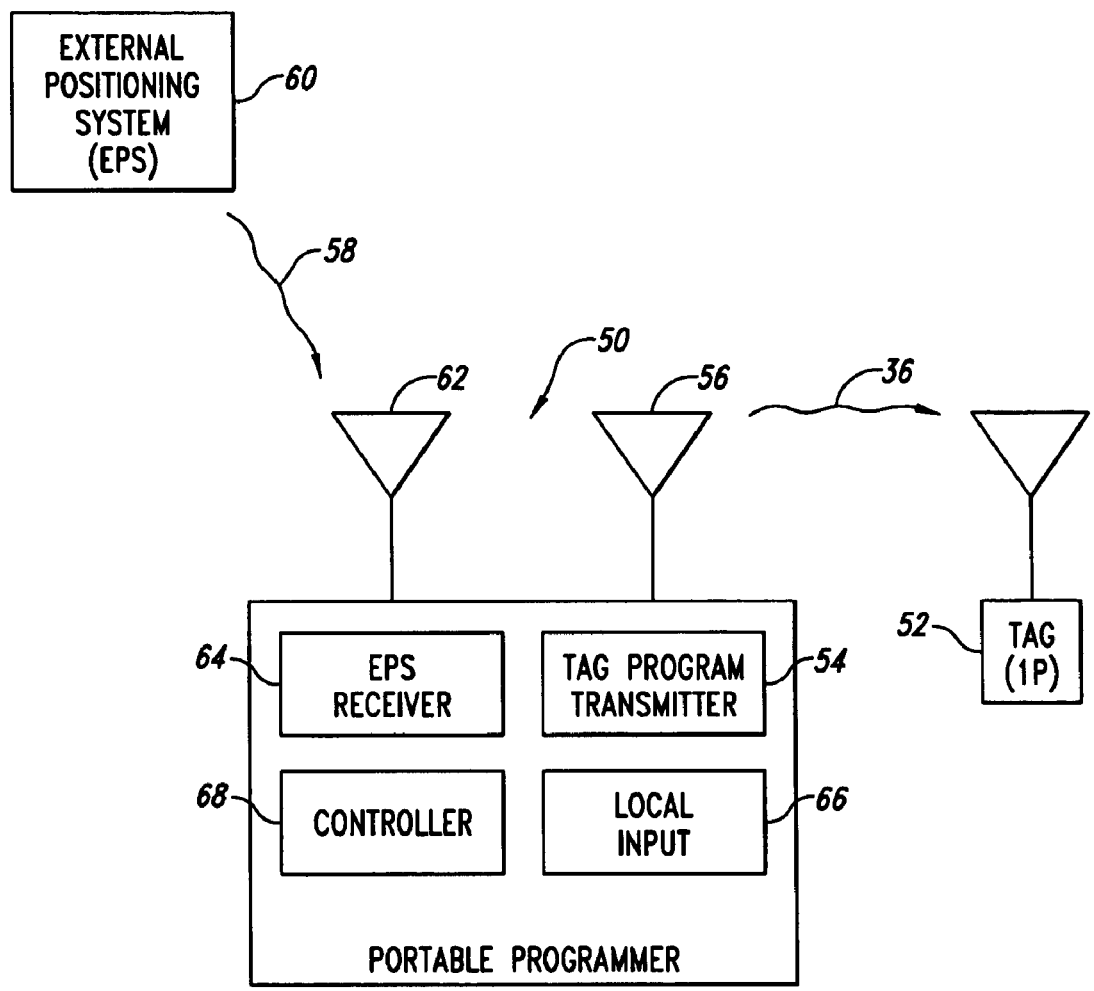
FIG. 3 is a schematic diagram showing an implementation of a portable programmer system in operation with an external positioning system and a single position tag.

In some implementations, a portable programmer 50 is used to program position information into the position tags 30. Some implementations of the portable programmer 50 include programming one position (1P) position tags 52 having the memory 44 sufficiently sized to contain information regarding one position (1P) such as shown in FIG. 3. The portable programmer 50 includes a tag program transmitter 54 that is coupled to a transmitting antenna 56 to transmit the position information programming control signals 36 to the position tags 30.

Position information to be programmed into one of the position tags 30 is inputted to the portable programmer 50 and stored, such as in the tag programmer 54. In one embodiment, broadcast position information 58 is received by the portable programmer from an external positioning system (EPS) 60 through a receiving antenna 62 and an EPS receiver 64. The Global Positioning System (GPS) managed by the Department of Defense, with its satellite-based broadcast of position information, is one example of the external positioning system 60. Other examples of the external positioning system 60 include systems broadcasting other position information such as time and position coordinate information associated with one or more architectural structures, geographical points of interest, or geological structures. Alternatively, a local input 66, such as a keypad or other input device, could be used to manually input position information into the portable programmer 50. Although the portable programmer 50 is shown in FIG. 3 to include both the EPS receiver 64 and the local input 66, some implementations of the portable programmer only have one way of inputting position information into the portable programmer. Other implementations of the portable programmer 50 can include use of a single antenna or multiple antennas that are functionally equivalent to the combined functions of the transmitting antenna 56 and the receiving antenna 62. Some implementations of the portable programmer 50 also include a control 68 that coordinates input of position information into, and transmission of position information from, the portable programmer.

Figure 4:
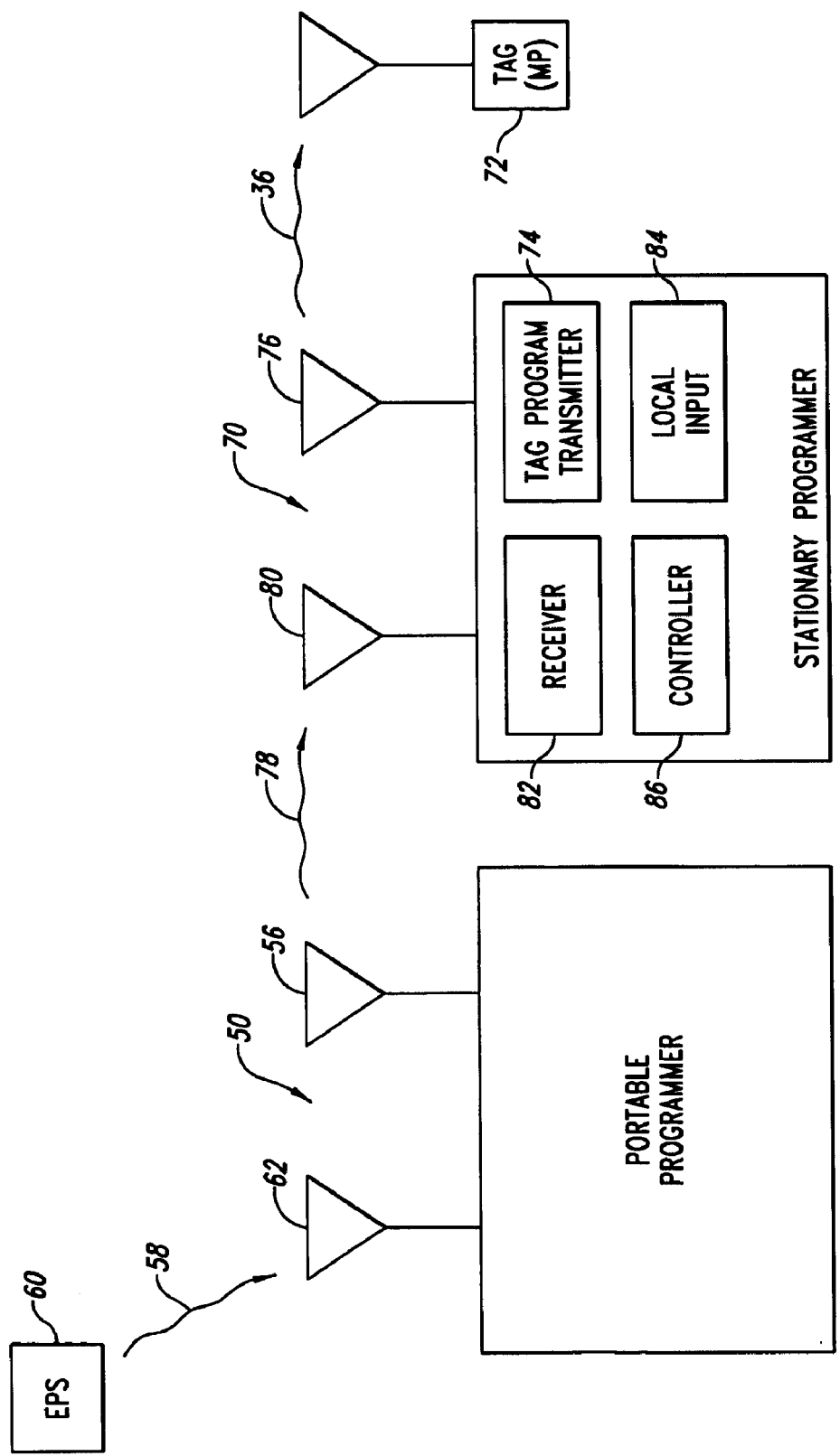
FIG. 4 is a schematic diagram showing an implementation of a stationary programmer system in operation with the portable programmer system as shown in FIG. 3 and a multiple position tag.

In some implementations, such as shown in FIG. 4, a stationary programmer 70 is used to program position information into the position tags 30. Some implementations of the stationary programmer 50 include programming multi-position (MP) position tags 72 having the memory 44 sufficiently sized to contain information regarding more than one position. The stationary programmer 70 includes a tag program transmitter 74 that is coupled to a transmitting antenna 76 to transmit the position information programming control signals 36 to the position tags 30.

Position information to be programmed into one of the position tags 30 can be inputted to the stationary programmer 70 via several methods, including use of the broadcast position information 58 received by the portable programmer 50 from the external positioning system (EPS) 60. The portable programmer 50 transmits a position information signal 78 containing the broadcast position information 58 to the stationary programmer 70. The position information signal 78 is received by a receiving antenna 80 and processed by a receiver 82 coupled to the receiving antenna. The receiver 82 could also be configured similarly as the EPS receiver 64 of the portable programmer 50 to directly receive the broadcast position information 58, but this may increase unit cost of the stationary programmer 70 to possibly impact deployment of large numbers of the stationary programmer.

Alternatively, a local input 84, such as a keypad or other input device, could be used to manually input position information into the stationary programmer 70. Although the stationary programmer 70 is shown in FIG. 4 to include both the receiver 82 and the local input 84, some implementations of the stationary programmer only have one way of inputting position information into the stationary programmer. Other embodiments may have an adapter to receive a detachable input device. The stationary programmer 70 may include use of a single antenna or multiple antennas that are functionally equivalent to the combined functions of the transmitting antenna 76 and the receiving antenna 80. Some implementations of the stationary programmer 70 also include a control 86 that coordinates input of position information into and transmission of position information from the stationary programmer.

Figure 5:
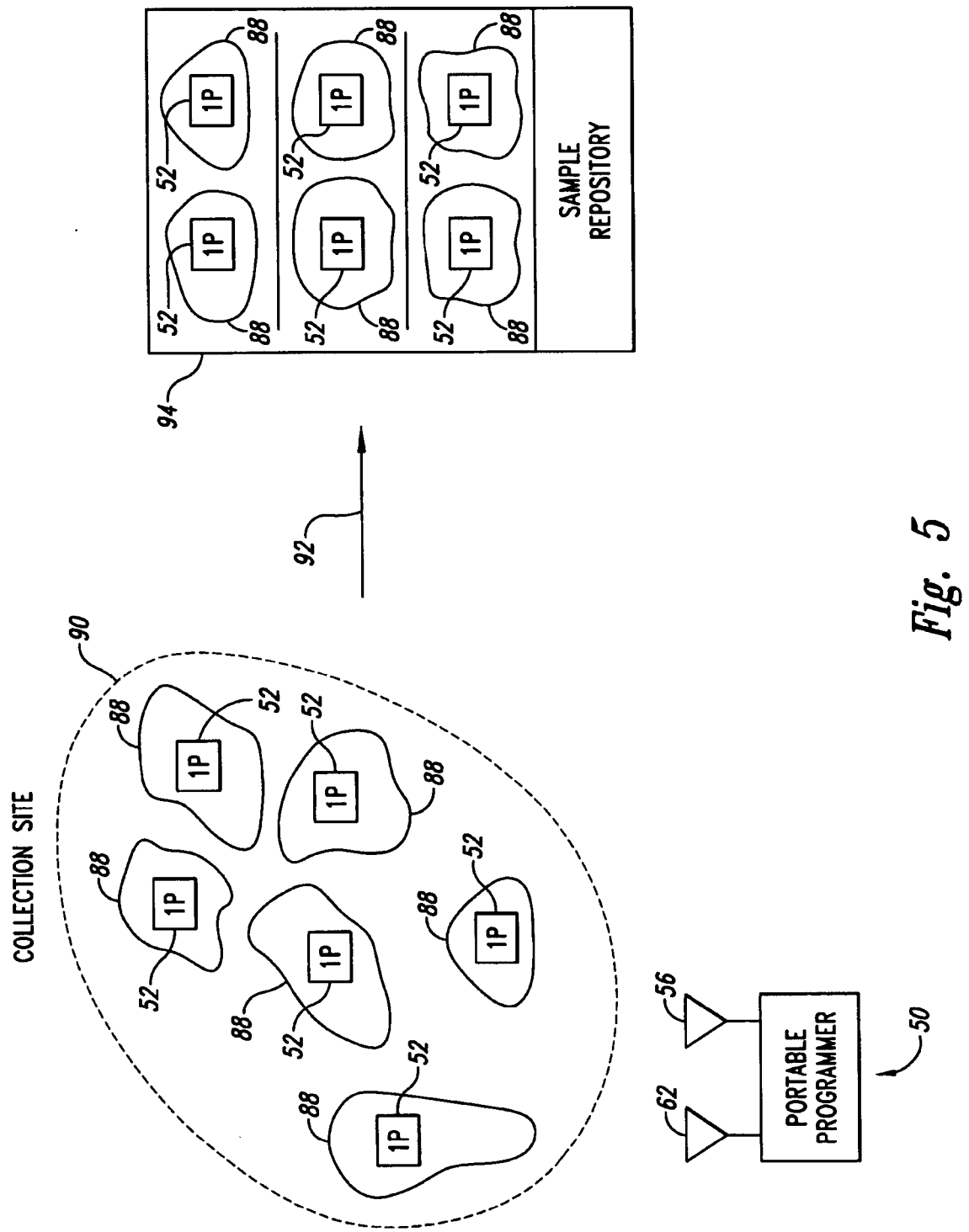
FIG. 5 is a schematic diagram showing operational detail of an implementation of a portable programmer with single position tags as used in conjunction with sample collection.

An exemplary use of the portable programmer 50 in conjunction with the 1P position tags 52 for position labeling of collection samples is shown in FIG. 5. In this example, the 1P position tags 52 are affixed to samples 88 found in a collection site 90. The portable programmer 50 is then used to program each of the 1P position tags 52 to indicate either absolute or relative position of each of the samples 88 with respect to their original positions at the collection site 90. The samples are then moved, indicated by arrow 92, to a sample repository 94 to be further studied. Additional study of the samples 88 can be aided by the programmed 1P position tags 52 since they contain either the relative or absolute original position of the samples in the collection site 90. For instance, it is possible that the collection site 90 could be either physically or virtually reconstructed through use of the position information contained within the 1P position tags 52 identifying repositioning of the collected samples 88. Examples of the collection site 90 include, but are not limited to, archeological sites, construction sites, excavation sites, disaster sites, battlefields, accident sites, crime scenes, arson sites, geological sites, and any other site or other collection in which the original relative or absolute position of collected samples of the collection site 90 is of interest.

Figure 6:
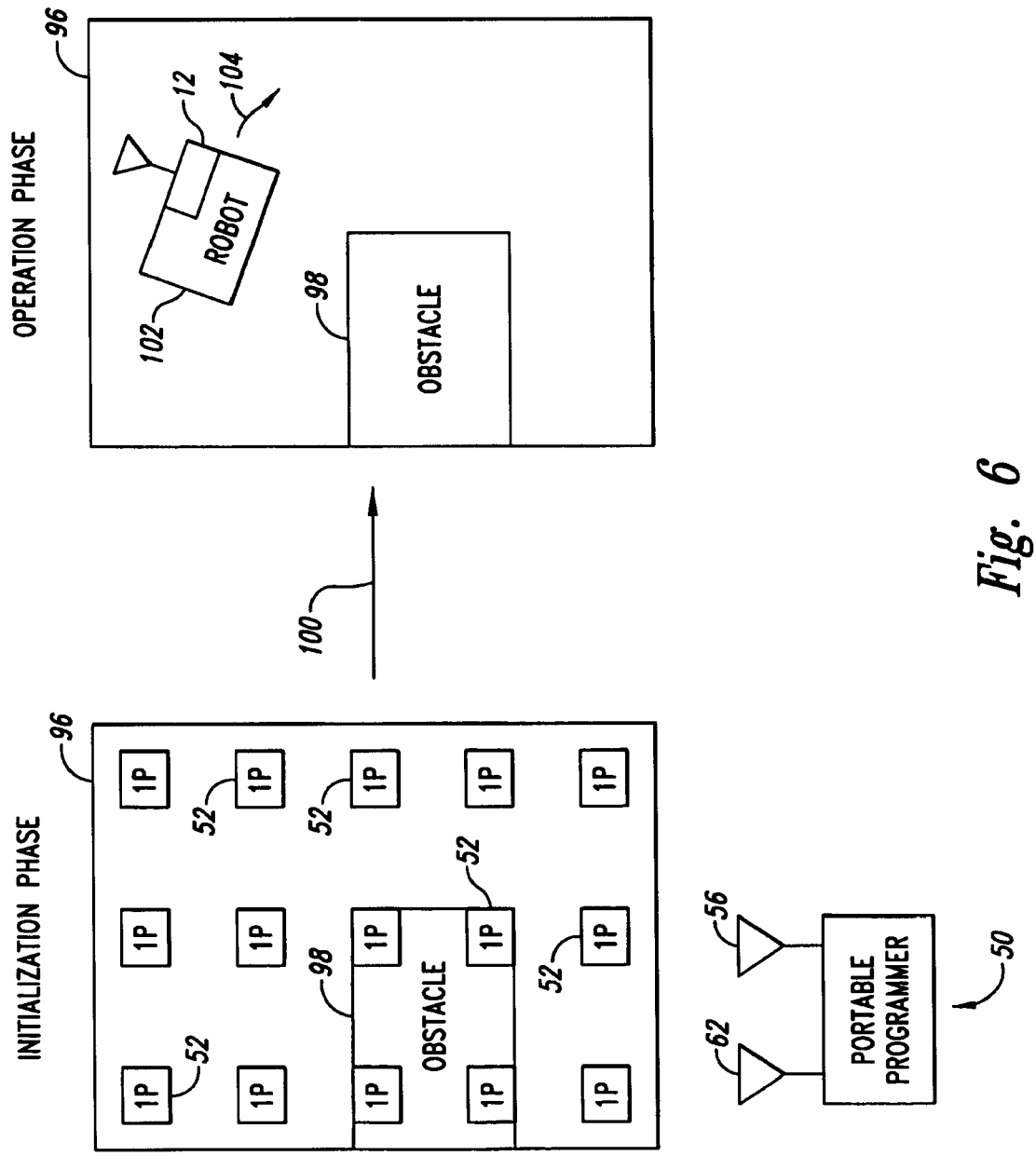
FIG. 6 is a schematic diagram showing operational detail of an implementation of a portable programmer with single position tags as used in conjunction with position guidance.

Another exemplary use of the portable programmer 50 in conjunction with the 1P position tags 52 for position guidance of subjects such as robots, individuals, or vehicles is shown in FIG. 6. The 1P position tags 52 are positioned in an area 96, such as an interior area of a building. In this example, the area 96 also includes an obstacle 98. The 1P position tags 52 are shown in FIG. 6 to have a substantially regular spacing order; however, in other implementations, spacing of the 1P position tags can be of an irregular nature. The 1P position tags 52 can also include position information regarding particular attributes of the area 96 with respect to the particular positions of the 1P position tags. For instance, the 1P position tags 52 shown as being positioned in or near the corners of the obstacle 98 could contain information identifying the obstacle. Other position information could include that generally discussed above regarding additional information including information related to the position identified by one of the 1P position tags 52, related to a purpose for the area 96, and related to a purpose for the subject. For instance, if the area 96 was a warehouse for storing items to be later gathered and the subject was a gatherer, one or more of the 1P position tags 52 could contain identification information related to the type of items located near the position of the 1P position tag. Alternatively, additional information could be related to particular positions identified by the 1P position tags 52 through a database on board or separate from the subject.

Once the 1P position tags 52 are properly positioned in stationary locations in the area 96, the portable programmer 50 is used to program each of the 1P position tags with their respective positions, either absolute or relative, with respect to the area. After transitioning from an initialization phase to an operation phase, as indicated by an arrow 100, a subject, such as a robot 102, using a unique one of the interrogators 12 configured to request and receive position information from the 1P position tags 52, shown hidden in the operation phase of FIG. 6, is used to navigate a path 104. The interrogator 12 and the 1P tags 52 are so chosen and positionally oriented regarding strength of signals transmitted and received such that the subject receives position information from the 1P position tags appropriate to the position of the subject as it receives the position information. Depending upon the implementations and subject involved, the path 104 can be predetermined or can be determined in real time. Position guidance based upon position information obtained from the 1P position tags 52 could include range and bearing.

Other examples of the area 96 include, but are not limited to, warehouses, factory floors, jogging or hiking trails, bicycle paths, shopping malls, office parks, airports, rail stations, bus stations, tourist attractions, amusement parks, local roadways, state and interstate highways and freeways, fairs, theaters, exhibit halls, sports stadiums, museums, art galleries, farms, drilling or mining sites, construction sites, battlefields, ocean liners, cargo ships, oil tankers, airplanes, naval vessels, drilling rigs, elevators, racetracks, golf courses, bodies of water including harbors, lakes, docking areas, ship canals, railyards, airplane runways, schools, universities, libraries, hospitals, grocery stores, pharmacies, department stores, tool houses, wrecking yards, spacecraft, and any other area in which position guidance of a subject is of interest.

Figure 7:
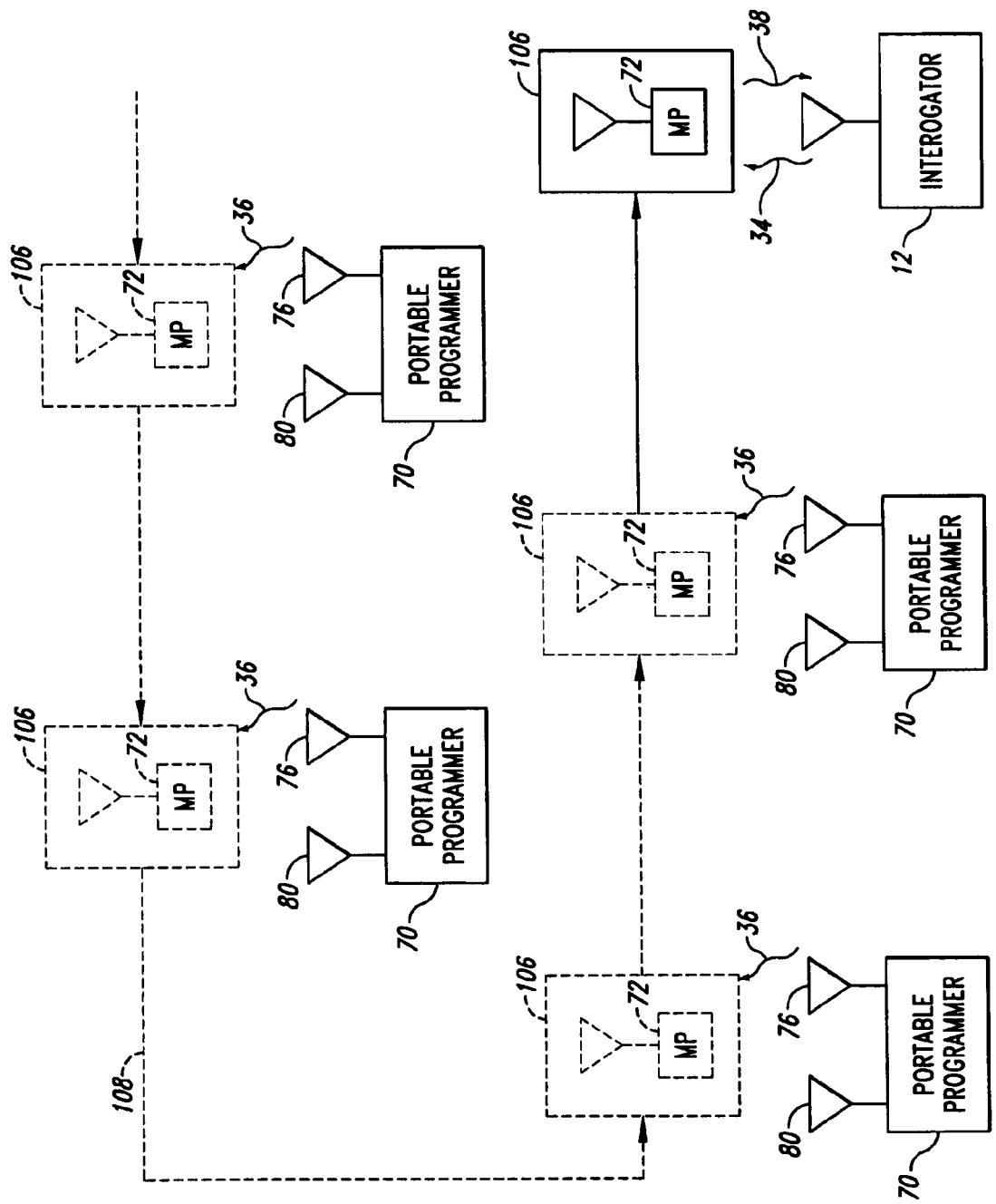
FIG. 7 is a schematic diagram showing operational detail of an implementation of a stationary programmer with a multiple position tag as used in conjunction with route recordation.

An exemplary use of a group of the stationary programmers 70 in conjunction with one of the MP position tags 72 affixed to a moving subject 106, such as a robot, an individual, or a vehicle, for route recordation of the moving subject 106 is shown in FIG. 7. Initially, each of the stationary programmers 70 are programmed with information regarding their positions. In implementations, the stationary programmers 70 are positioned along a path 108 to be taken by the moving subject 106 to allow the MP position tag 72 of the moving subject to receive the position information programming control signal 36 from each stationary programmer as the moving subject passes within the vicinity of each stationary programmer.

After completing the path 108, the MP position tag 72 of the moving subject 106 contains position information for each of the stationary programmers 70 found along the path. This position information can then be requested and received by a special interrogator 12 configured to transmit the position information request signals 34 to the MP position tag 72 of the moving subject 106 and to receive the requested position information 38 from the MP position tag of the moving subject. In this example, the requested position information 38 would include for each of the stationary programmers 70 a fixed position near the stationary programmer and its absolute or relative position and the relative or absolute times that the moving subject 106 passed by the fixed position.

Figure 8:
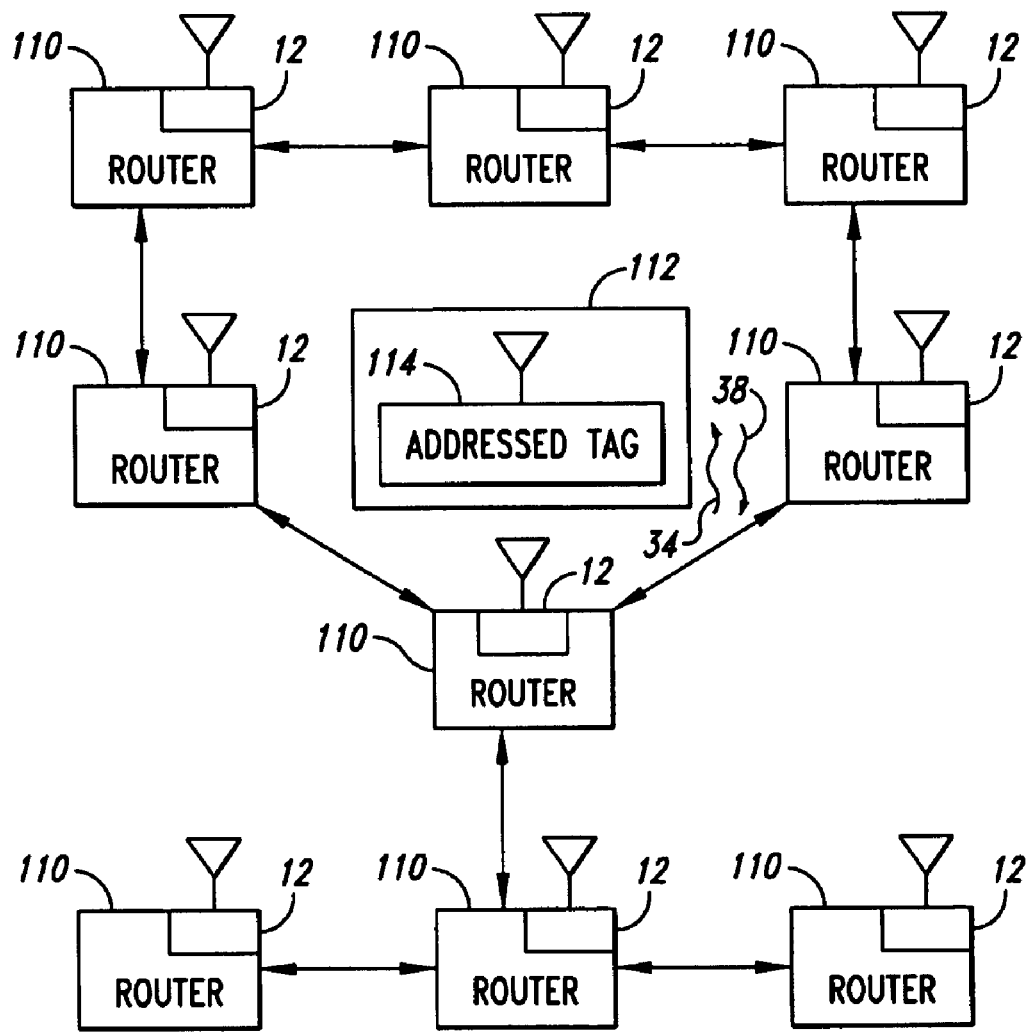
FIG. 8 is a schematic diagram showing operational detail of an implementation of a router network for a subject with an affixed addressed tag as used in conjunction with position guidance.

FIG. 8 shows exemplary use of a network of branch nodes connected together by paths having subject routers 110 each located at one of the branch nodes of the network and containing one of the interrogators 12. Each of the interrogators 12 are configured to request and receive position information for directing transit of a subject 112 having an affixed addressed tag 114. As the subject 112 passes one of the subject routers 110, the subject router sends the position information request signal 134 to the addressed tag 114. In turn, the addressed tag 114 of the subject 112 sends the requested position information 38 back to the requesting subject router 110. The position information contained by the addressed tag 114 includes the destination address of the associated subject 112. The destination address can take many forms including street address and GPS coordinates or other address forms or coordinates. Upon receipt of the destination address contained within the position information of the addressed tag 114, the subject router 110 performs any adjustments necessary to properly direct the subject 112 on to the next subject router to finally allow the subject to arrive at its final destination identified by the position information received from the addressed tag 114. Principles of operations research is used in some implementations for directing the subject 112. Other implementations of the addressed tag 114 need not use the subject routers 110. For instance, another implementation of the addressed tag 114 could involve subjects being sorted by their destination addresses as indicated by their addressed tags.

From the foregoing it will be appreciated that, although specific embodiments of the invention have been described herein for purposes of illustration, various modifications may be made without deviating from the spirit and scope of the invention. Accordingly, the invention is not limited except as by the appended claims and the equivalents thereof.

The invention claimed is:

1. A position tag for communication with a GPS enabled programmer comprising:
   a memory configured to store position information;
   at least one radio frequency antenna; and
   a receiver circuit coupled to the at least one radio frequency antenna, the receiver configured to receive radio frequency control signals and radio frequency position request signals via the at least one radio frequency antenna from the GPS enabled programmer, and to send radio frequency signals containing position information about a fixed position via the at least one radio frequency antenna responsive to the position request signals, the memory configured to store position information about the fixed position in response to the control signals and to recall position information in response to the position request signals.

2. The position tag of claim 1 wherein the position information stored by the memory includes position coordinates associated with the fixed position of the position tag.

3. The position tag of claim 1 wherein the position information stored by the memory includes identification of an intended recipient.

4. The position tag of claim 1 wherein the position information stored by the memory includes a timestamp associated with a time when the position information was stored in the memory.

5. The position tag of claim 1 wherein the position information stored by the memory includes position coordinates based upon an external positioning system.

6. The position tag of claim 1 wherein the position information stored by the memory includes position coordinates associated with a building.

7. The position tag of claim 1 wherein the position information stored by the memory includes position coordinates associated with a sample collection site.

8. The position tag of claim 1 wherein the position information stored by the memory includes position coordinates of multiple positions achieved by a subject affixed to the position tag during a period of time when the subject traversed a route.

9. The position tag of claim 1 wherein the memory is sized sufficient for storage of information regarding one position.

10. The position tag of claim 1 wherein the position information stored by the memory includes a destination address for a subject affixed to the position tag.

11. The position tag of claim 1 wherein the memory stores position information by using one or more pointers to point to position references.

12. The position tag of claim 1 wherein the memory stores position information by storing absolute position references.

13. The position tag of claim 1, further comprising a control coupled to the memory and the receiver, the control configured to instruct the memory to store position information in response to the control signals and to recall position information in response to the position request signals.

14. The position tag of claim 1 wherein the position information stored by the memory includes position coordinates broadcast by the United States Department of Defense managed Global Positioning System (GPS).

15. A position tag programmer for use with at least one remote position tag, comprising:
   at least one radio frequency antenna;

a receiver configured to receive position information radio signals regarding the position of the remote position tag from an external position reference system via the at least one radio frequency antenna; and a tag program transmitter coupled to the receiver and configured to transmit radio frequency position information control signals via the at least one radio frequency antenna to the remote position tag for storage in the position tag of the position information received from the external position reference system.

16. The position tag programmer of claim 15 wherein the receiver is configured to receive position information radio signals from the United States Department of Defense managed Global Positioning System (GPS) as the external position reference system.

17. The position tag programmer of claim 15 wherein the tag programmer transmitter is further configured to transmit position information control signals via the at least one radio frequency antenna to a second position tag programmer for storage in the second position tag programmer of the position information received from the external position reference system.

18. The position tag programmer of claim 15, further comprising a local input configured to provide manual input of position information.

19. The position tag programmer of claim 15, further comprising a battery to provide electrical power to components of the position tag programmer including the receiver and the tag program transmitter.

20. The position tag programmer of claim 15 wherein the tag program transmitter is further configured to store the position information received from the external position reference system.

21. The position tag programmer of claim 15, further comprising:

an adapter configured to removably couple to an input device, the input device configured to input position information to the position tag programmer.

22. The position tag programmer of claim 21 wherein the adapter is configured to removably couple to a keypad as the input device.

23. The position tag programmer of claim 21 wherein the adapter is configured to removably couple to a receiver as the input device, the receiver configured to receive position information radio signals from an external position reference system.

24. The position tag programmer of claim 15, further comprising a memory configured to store position information regarding multiple positions and associated timestamps from the position tag with respect to a route recordation by the position tag of a traveling subject affixed to the position tag.

25. A method of providing position guidance to a subject with respect to an area, the method comprising:

dispersing position tags to fixed locations in the area;

receiving at a remote programmer position information associated with each fixed location in the area;

programming each position tag to store the received position information associated with its fixed location by transmitting the position information via radio frequency signals to each position tag from the programmer; and directing movement of the subject within the area based upon receiving position information stored in the positions tags dispersed to the fixed locations within the area.

26. The method of claim 25, further comprising sending information request signals from points of origination, the signals configured to be received by a dispersed position tag when the position tag is located within a predetermined maximum distance from the points of origination.

27. The method of claim 25 wherein the programming further includes the received position information having position coordinates relative to other fixed positions within the area.

28. The method of claim 25 wherein directing movement of the subject within the area further includes providing instructions intelligible to a human.

29. The method of claim 25 wherein directing movement of the subject within the area further includes providing instructions intelligible to a robot.

30. The method of claim 25 wherein directing movement of the subject within the area further includes providing instructions intelligible to a vehicle.

31. The method of claim 25 wherein receiving further includes receiving position information from the United States Department of Defense managed Global Positioning System (GPS).

32. A method of recording travel by a subject along a route, the method comprising:

dispersing position tag programmers to locations along the route;

programming each of the dispersed position tag programmers to store local position information related to the location of the dispersed position tag programmer;

affixing a position tag to the subject, the position tag configured to store position information related to a plurality of positions;

programming the position tag to store the local position information stored in each of the position tag programmers into the position tag as the position tag passes within range of the position tag programmer; and programming the position tag using each of the dispersed position tag programmers to store a timestamp within the position tag associated with the time that the position tag passed within range of the position tag programmer.

33. The method of claim 32, further comprising reading the local position information and timestamps stored in the position tag after the subject has completed travel of at least a portion of the route.

34. The method of claim 32 wherein programming each of the dispersed position tag programmers further includes local position information being based upon position coordinates relative to other positions along the route.

35. The method of claim 32 wherein programming each of the dispersed position tag programmers further includes local position information being based upon position information from the United States Department of Defense managed Global Positioning System (GPS).

36. A system for subject position information, the system comprising:

a remote position tag including:
a memory configured to store position information;
at least one radio frequency antenna; and
a receiver circuit coupled to the at least one radio frequency antenna, the receiver configured to receive radio frequency control signals and radio frequency position request signals via the at least one radio frequency antenna, and to send radio frequency signals containing position information about a fixed position via the at least one radio frequency antenna responsive to due position request signals, the memory configured to store position information about the fixed position in response to the control signals and to recall position information in response to the position request signals; and a position tag programmer including:
  at least one radio frequency antenna;
  a receiver configured to receive position information radio signals about the position of the remote position tag from an external position reference system via the at least one radio frequency antenna; and
  a tag program transmitter coupled to the receiver and configured to transmit radio frequency position information control signals via the at least one radio frequency antenna to the remote position tag for storage in the remote position tag of the position information received from the external position reference system.

37. The system for subject position information of claim 36 wherein the position tag programmer further comprises:
  an adapter configured to removably couple to an input device, the input device configured to input position information to the position tag programmer.

* * * * *

UNITED STATES PATENT AND TRADEMARK OFFICE
CERTIFICATE OF CORRECTION

PATENT NO. : 6,975,229 B2
DATED : December 13, 2005
INVENTOR(S) : Curt Carrender It is certified that error appears in the above-identified patent and that said Letters Patent is hereby corrected as shown below:

<u>Column 11,</u>
Line 1, "due" should read -- the --.

Signed and Sealed this

Twenty-first Day of March, 2006

JON W. DUDAS
*Director of the United States Patent and Trademark Office*